March 10, 1964 R. A. TANNER 3,124,288
DEVICE FOR REMOVING SICKLE BAR SECTIONS
Filed Feb. 7, 1963 2 Sheets-Sheet 1

INVENTOR.
RALPH A. TANNER
BY
Dunlap & Laney
ATTORNEYS

INVENTOR.
RALPH A. TANNER
BY
Dunlap & Laney
ATTORNEYS

United States Patent Office 3,124,288
Patented Mar. 10, 1964

3,124,288
DEVICE FOR REMOVING SICKLE BAR SECTIONS
Ralph A. Tanner, Alfalfa County, Okla.
(Box 135, Burlington, Okla.)
Filed Feb. 7, 1963, Ser. No. 257,816
4 Claims. (Cl. 225—103)

My invention relates to improvements in sickle section removers, and the general object of the invention is to provide a sickle section remover that will provide a way of removing sections from a sickle without removing the sickle from the machine on which the sickle is used. Such sickles are used on combines, mowing machines, swathers, and other equipment. I accomplish this by the novel construction and size that allowes it to fit between guards, but rigid enough to shear a rivet while pushing the section off of the sickle bar.

Referring to the drawings.

Figure 1:
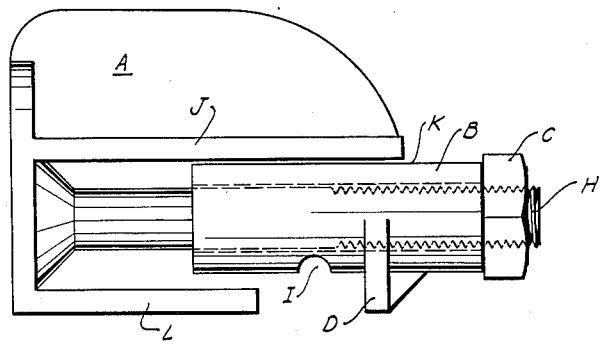
FIG. 1 is a side view of my sickle section remover.
Figure 2:
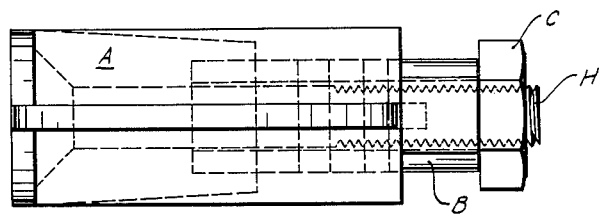
FIG. 2 is a top view.
Figure 3:
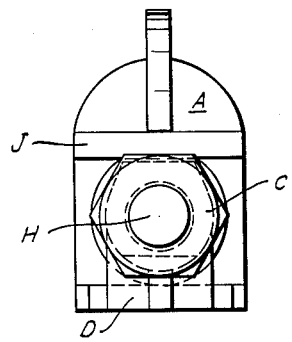
FIG. 3 is the end view.
Figure 4:
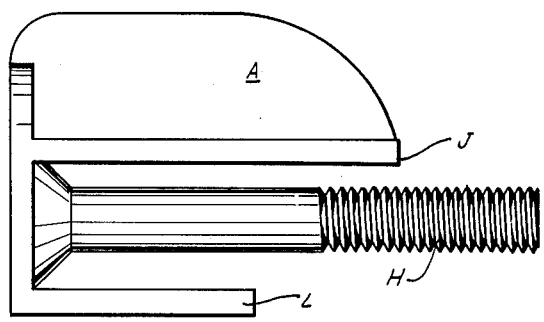
FIG. 4 is a side view of main body consisting of one piece rigidly constructed.

Referring to the drawings in detail, and particularly FIGS. 1 through 3, it will be seen that the device basically comprises a frame A, a jaw B and a nut C for moving the jaw B along the frame A. The main frame A may be formed in any desired manner, such as by a casting or by welding plates together, and, as shown in FIG. 4, includes a horizontally extending plate portion J forming a downwardly facing flat surface to function as a portion of a guide, as will be described. The frame A also includes a downwardly and rearwardly extending arm L, and a threaded shaft H extending horizontally between the plate portion J and the lower portion of the arm L. The threaded shaft H may take the form of any desired member, such as a bolt, and is welded or otherwise rigidly secured to the main body portion of the frame A to extend rearwardly from the frame as illustrated in FIG. 4.

Figure 5:
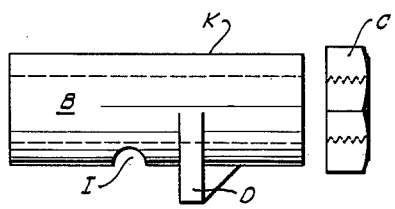
FIG. 5 is movable parts B and C of FIG. 1.

As shown in FIG. 5, the jaw B is in the form of a sleeve having a downwardly extending flange D and a recess I in the lower surface thereof immediately forward of the flange D for purposes to be described. The jaw B is of a size to be telescoped over the threaded shaft H of the frame A and has a flat upper surface K for mating with the lower surface of the frame plate portion J in order to retain the jaw B in a fixed angular position on threaded shaft H during operation of the device.

Figure 6:
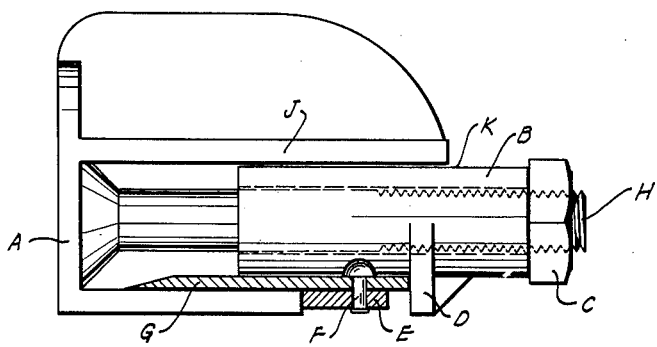
FIG. 6 shows machine in position on sickle ready to shear rivet.

As previously indicated, the device of this invention is provided to remove a section G (see FIG. 6) from a sickle bar E by shearing the rivets F holding the section G on the sickle bar. Normally, the section G is secured on the top surface of the sickle bar E and extends forwardly from the sickle bar, and a plurality of guards (not shown) are supported along the length of the machine on which the sickle bar E is used to direct material to be cut into the path of the sickle sections and function with the cutting surfaces of the section G. It may also be noted that the trailing end of the section G is positioned rearwardly of the trailing edge of the sickle bar E and that the head of the rivet F protrudes above the upper surface of the section G.

In operation of the device, the frame A is positioned over the top of the section G to be removed, with the arm L extending rearwardly underneath the section G into contact with the forward edge of the sickle bar E. The jaw B is then telescoped over the threaded shaft H with the flat surface K of the jaw in contact with the lower surface of the frame plate portion J and with the recess I loosely receiving the head of the rivet F. It may also be noted that the jaw B is moved forwardly on the threaded shaft H until the downwardly extending flange D contacts the trailing edge of the section G. The nut C is then threaded onto the shaft H into contact with the trailing end of the jaw B. Further tightening of the nut C on the threaded shaft H forces the jaw B forwardly to impose a forward force on the section G. It will also be noted that since the arm L is in contact with the leading edge of the sickle bar E, the frame A will impose an equal and opposite rearward force on the sickle bar E. As a result, the tightening of the nut C will force the section G forwardly to shear the rivet F. There are two rivets F on each section G, so when both rivets are sheared, the operator can readily remove the section G from the sickle bar E.

Having now described my invention, what I claim as new therein, and desire to secure by Letter Patent, is as follows:

1. A device for removing a section riveted to the upper surface of a sickle bar and extending forwardly from the sickle bar without removing the sickle bar from the machine on which it was used, comprising:
   a frame of a size to be positioned above the sickle bar and the section to be removed;
   an arm rigidly supported on the frame in a position to extend rearwardly under the section to be removed into contact with the forward edge of the sickle bar;
   guide means on the frame extending horizontally over the section to be removed;
   a jaw slidingly supported on the guide means and having a downwardly extending flange thereon positioned to engage the trailing edge of the section to be removed; and
   means for forcing the jaw forwardly on the guide means while holding said arm against the forward edge of the sickle bar for shearing the rivet securing the section to be removed to the sickle bar.

2. A device as defined in claim 1 wherein said guide means includes a horizontally extending threaded shaft rigidly secured to the frame;
   said jaw comprises a sleeve telescoped over said shaft; and
   said means for forcing the jaw forwardly comprises a nut threaded onto the said shaft behind the said jaw.

3. A device as defined in claim 2 wherein said guide means comprises a plate portion on the frame positioned above and parallel with said shaft, and wherein said sleeve has one flat side positioned to slide under and in contact with said plate portion to prevent the sleeve from turning on the shaft.

4. A device as defined in claim 3 wherein the vertical thickness of the sleeve corresponds to the space between said plate portion and the upper surface of the section to be removed, and wherein said sleeve has a recess in one side thereof arranged to loosely receive the head of the rivet to be sheared when the device is placed in operating position on the sickle bar.

References Cited in the file of this patent
UNITED STATES PATENTS 1,299,134   Crompton _____ Apr. 11, 1919
2,101,434   Johnston _____ Dec. 7, 1937